United States Patent [19]

Harrington

[11] Patent Number: 4,459,846
[45] Date of Patent: Jul. 17, 1984

[54] FUEL CONSUMPTION TESTING ARRANGEMENT

[75] Inventor: Eugene Harrington, Pekin, Ind.

[73] Assignee: Tune O Mize Inc., Louisville, Ky.

[21] Appl. No.: 157,219

[22] Filed: Jun. 9, 1980

[51] Int. Cl.³ .................................................. G01F 9/02
[52] U.S. Cl. .................................................. 73/114
[58] Field of Search ..................... 73/114, 113, 168; 324/429

[56] References Cited

U.S. PATENT DOCUMENTS

| | | | |
|---|---|---|---|
| 2,073,243 | 3/1937 | Liddell et al. | 73/113 |
| 3,905,225 | 9/1975 | Moss et al. | 73/114 X |
| 3,967,133 | 6/1976 | Bokern | 324/429 X |
| 4,136,389 | 1/1979 | Vogel | 73/114 X |

Primary Examiner—Jerry W. Myracle
Attorney, Agent, or Firm—Edward M. Steutermann

[57] ABSTRACT

The present invention provides a fuel consumption testing arrangement for use in the analysis of internal combustion engines having fuel carburation device, including a fuel source, a constant rate fuel pump communicating with the fuel source to receive fuel from the fuel source and deliver a selected rate of fuel, fuel pressure regulator to receive fuel from the fuel pump and supply the fuel at a selected pressure, a fuel flow transducer device communicating with the outlet of the fuel pressure regulator to measure the rate of flow of fuel from the fuel pressure regulator and having an outlet including a connector to connect the supply from the flow transducer to the carburetor of the internal combustion engine to be tested, a source of electrical power to deliver a smooth flow of current to drive the fuel pump, speedometer to sense the speed of rotation of the internal combustion engine under test, and a computation device to inter-relate the speed of rotation of the internal combustion engine under test and the fuel flow rate to provide output signal indicative of the relationship.

8 Claims, 2 Drawing Figures

4,459,846

FUEL CONSUMPTION TESTING ARRANGEMENT

BACKGROUND OF THE INVENTION

Current increased fuel cost and decreased fuel availability have enhanced the need for accurate "tuning" of internal combustion engines and particularly for accurate tuning of automotive engines.

The present invention recognizes that in order to accurately evaluate results of ignition and carburation adjustments to an internal combustion engine accurate adjustment of carburation devices for automotive engines it is principally dependent upon a uniform, accurately measured rate of flow to the automotive engine.

No prior art arrangement is known where a unitary device is provided to measure fuel flow to the carburation means of an automotive device at various speeds including means to supply a carefully regulated flow of fuel to the engine at a preselected pressure. In this regard all prior known devices wherein a transducer type of arrangement is utilized to measure fuel flow to an internal combustion engine, the arrangement provides means to attach the transducer to the fuel line of the automotive device so that the fuel supply and fuel pump of the automotive device under test are utilized to supply fuel rate to the carburetor means. It has been found that typically the fuel supply systems of automotive devices are insufficient for analysis of the engine in that the rate of fuel supplied by the automotive fuel supply means fluctuates widely during operation as does the pressure of the fuel. In accordance with the present invention it has been found that the flucuation in the rate of flow of the fuel supply, and in the pressure at which the fuel is supplied, seriously adversely affect the attempts to optimize carburation.

Additionally, devices within the scope of the present invention substantially reduce the time required for performing fuel consumption tests on automotive devices and provide greatly enhanced accuracy in the results obtained.

SUMMARY OF THE INVENTION

The present invention provides a new and useful test arrangement for automotive devices wherein the fuel supply means include a fuel pump which delivers a uniform rate of flow of fuel and pressure regulator means to accurately regulate the pressure at which the fuel is provided, in series with a transducer where the elements are carried by a unit and a connection means is provided to the carburetor of the vehicle under test.

It has been further found that use of devices within the scope of the present invention greatly enhance the accuracy of any test performed on internal combustion engines of automotive vehicles and further provide means for decreasing the time necessary for adjustment of the engine system and other characteristics of the automotive device to determine an efficiency increase.

The present invention further provides a straight forward, inexpensive time saving arrangement for testing automotive fuel consumption which eleiminates inaccuracies inherent in the fuel supply systems of automotive vehicles so the optimum operating characteristics of the automotive vehicle can be obtained.

One example of an arrangement within the scope of the present invention is illustrated in the accompanying Figures but it is to be understood that various other arrangements also within the scope of the present invention will become obvious to those skilled in the art upon reading of the disclosure set forth hereinafter.

One example of the present invention is illustrated in the accompanying Figures wherein:

BRIEF DESCRIPTION OF THE DRAWINGS

Referring now to FIG. 1 an engine 1 is shown having a carburator 2 including an air intake 3 and a fuel connection 4 to supply fuel to the engine as is known in the art. In the course of testing, the connection from the automotive fuel supply to the carburetor is removed and blocked.

Figure 1:
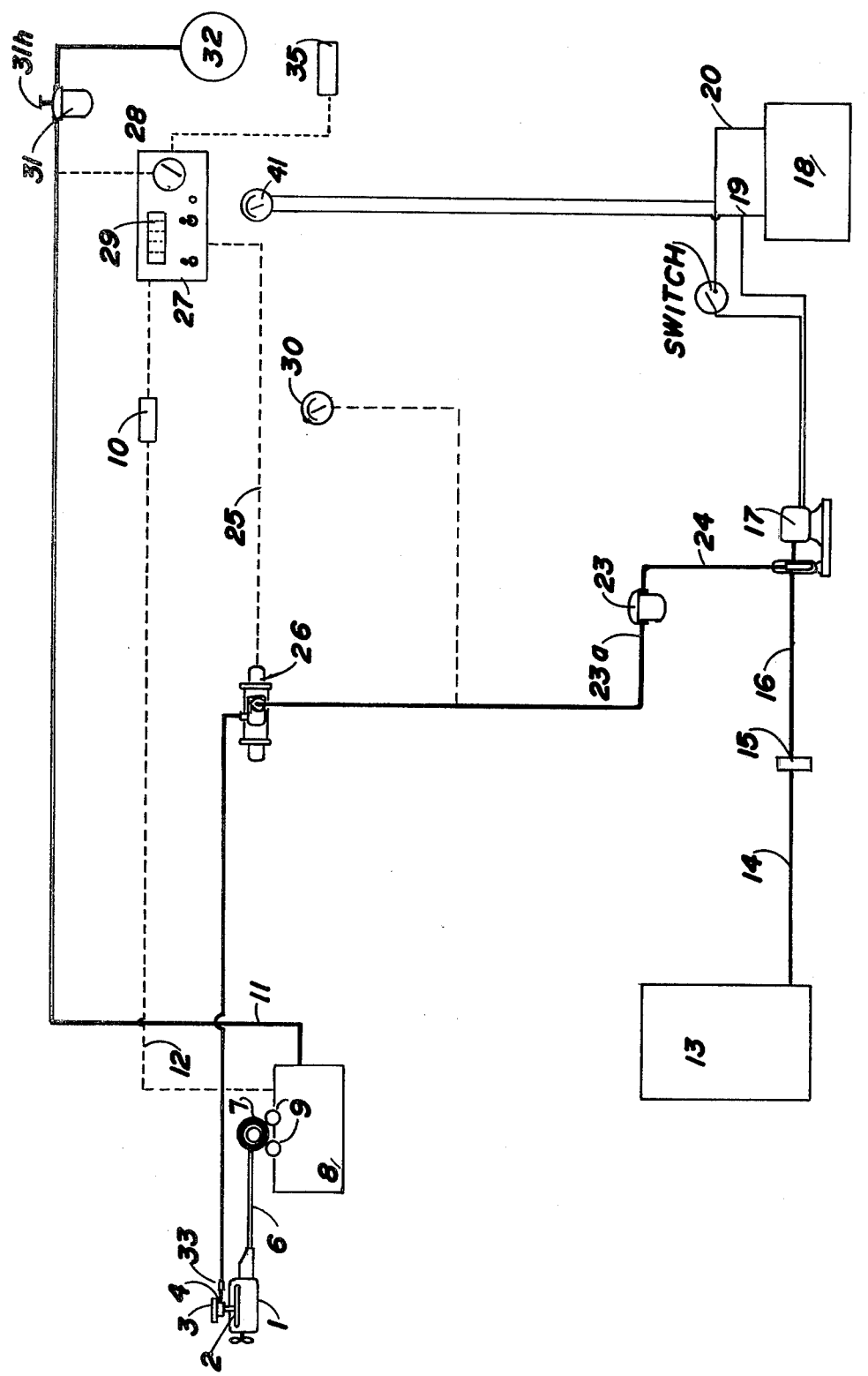
FIG. 1 is a schematic illustration of an arrangement within the scope of the present invention.

An output shaft 6 is provided, as is known in the art, which rotates in response to the conditions of the engine to rotate wheels 7. In the arrangement shown a dynamometer 8 is provided having rollers 9 which are rotated by the wheels 7. As is known in the art, a braking load is applied to wheels 9 for example, by shoes regulated pneumatically by means of air pressure to apply selected loads to the wheels. In this regard, an air inlet line 11 is provided to regulate the load applied to rollers 9 to be driven by wheels 7 and, as is also known in the art, the air presure in inlet line 11 determines the load applied to wheels 9.

A second output 12 is provided from dynamometer 8 which reflects the speed of rotation of wheels 7 at meter 10.

Typically, in a test, a load approximating the resistance encountered at, for example 50 miles per hour (MPH), is applied to rollers 9.

Output 12 is connected to and indicates the speed of the vehicle under test, for example, in MPH.

Within the scope of the present invention a fuel tank 13 is provided to supply a known fuel to an outlet 14 which is connected to the inlet of the fuel filter 15 to assure a supply of clean fuel to the carburator 2.

The outlet 16 from fuel filter 15 is connected to a fuel pump 17 which, within the scope of the present invention, is a constant rate pump to supply a uniform rate of fuel. Also within the scope of the present invention an electrical source, for example, a battery 18 having outputs 19 and 20 as provided to power fuel pump 17 a voltage meter 30 can be provided for visual battery condition indication.

It is recognized that within the scope of the present invention, to assure uniform delivery of fuel a constant source of electrical energy is necessary and it has been found particularly helpful to utilize a battery. The uniform rate of flow of fuel is provided through an outlet 24 to a fuel pressure regulator 23 which is included to assure a uniform rte of fuel is supplied at a uniform pressure. A pressure indicator 30 can be provided to indicate the fuel pressure. The outlet from fuel pressure regulator 23 is connected to a flow transducer 26 for example Flow Scan Model 660 provided by the Flow Scan Instrument Co. Inc. which permits passage of the fuel and senses the flow rate of the fuel. Transducer 26 includes outputs 27 which are supplied to a readout 27 which includes a readout meter 28 indicating the rate of fuel consumption or alternately the distance per unit of fuel consumption, for example miles per gallon (MPG). The readout 27 includes a computer as in known in the art where the readout in, for example MPG is obtained by integrating input 12 into the readout meter. A direct readout 29 of total fuel consumed can further be provided a remote fuel rate consumption indicator 35 can also be provided.

An adjusting device, for example, a pressure regulator valve 31 is further provided to regulate the pressure applied to air input 11 to dynamometer 8 from a source of higher pressure air 32. Output 25 from flow transducer 26 is then supplied to the carburator inlet 4.

In testing an automobile the normal fuel supply is removed from inlet 4 and capped as previously described. Outlet coupling 33 of fuel outlet 25 is connected to inlet 4 and carburator 2 and the engine 1 is started with wheels 7 in place on rollers 9 of dynamometer 8. A selected load is supplied to rollers 9 by adjustment of valve 31, for example so that the engine is operating under an equivalent load which it would normally encounter at 50 MPH. The rate of fuel consumption and the distance per unit of fuel consumption such as MPG is then noted and adjustments are made with respect to the carburator to minimize the flow rate or to maximize the distance per unit of fuel consumption. The adjustment can be made at various speeds and various loads depending upon the circumstances all as is known in the art.

Figure 2:
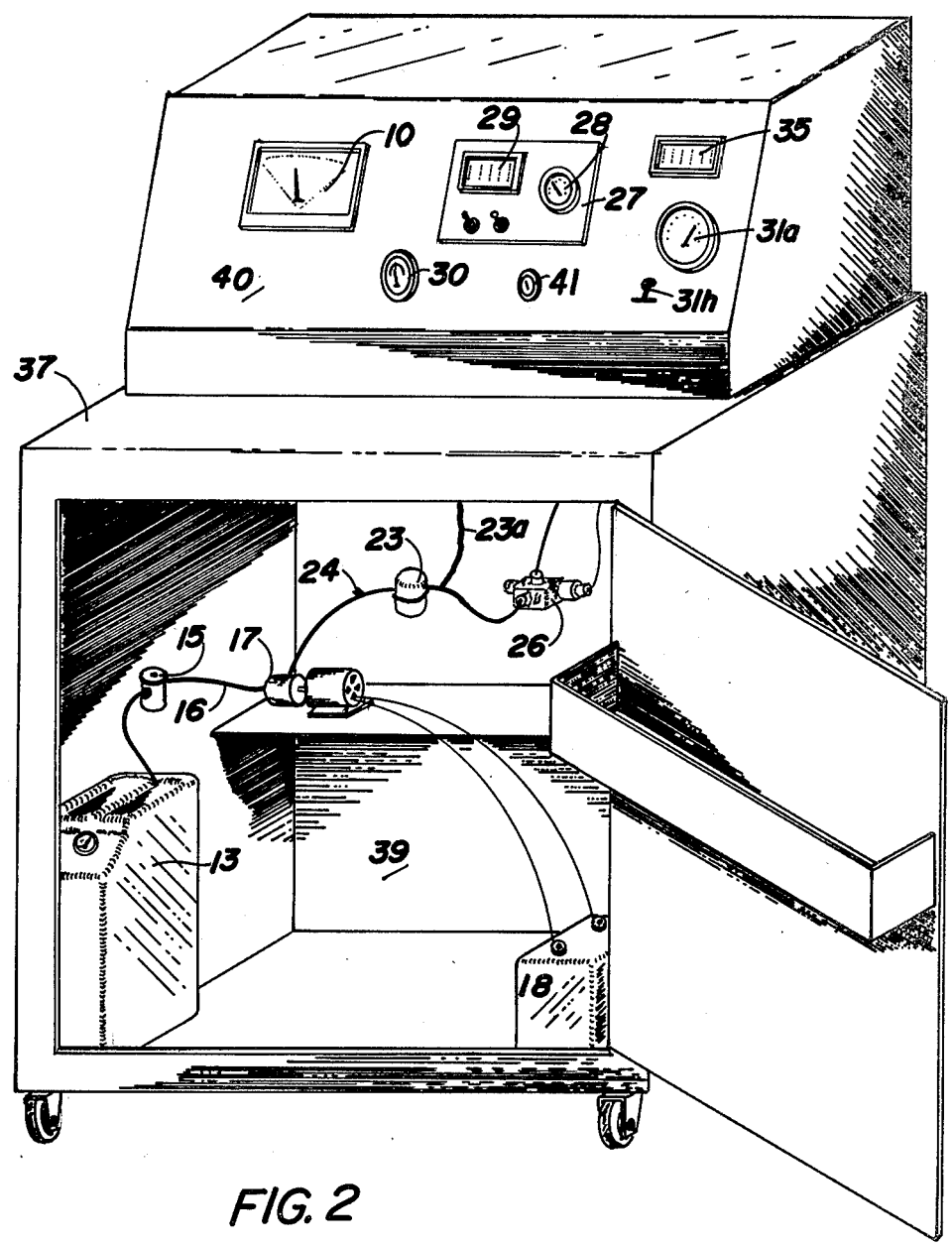
FIG. 2 is an illustration of the elements of FIG. 1 located within a portable test cabinet.

FIG. 2 is an illustration of an arrangement within the scope of the present invention illustrating the compact arrangement which can be provided and the mobility of such a device. In the illustration of FIG. 2 a cabinet 37 is provided having a door 38 providing access to the inside of a cabinet 39. Fuel source 13 is shown as a removable can having an outlet 14 to supply fuel to filter 15 thence to fuel pump 17 and to pressure regulator 23 with an outlet 23a from pressure regulator 24 is supplied to the flow transducer located in an upper cabinet 39. In the arrangement shown the valve 31 is shown on the face of console 38 as is the meter 28. Meter 8 is shown to directly read the rate of rotation of the wheel 7 and outlet line 25 from transducer 26 is shown in coiled arrangement on handles 39.

It is to be understood that the foregoing is but one arrangement within the scope of the present invention and various other arrangements also within the scope of the present invention will also occur to those skilled in the art upon reading of the disclosure.

I claim:

1. A fuel consumption testing device for analysis of internal combustion engines having fuel carburation means including fuel inlet, and includes a fuel source a direct current battery powered fuel pump means to receive fuel from the fuel source and deliver fuel at a uniform rate of flow, fuel pressure to supply the uniform rate of fuel at a selected pressure, flow transducer means to receive the flow of fuel from the fuel pressure regulator means wherein the flow transducer means includes signal output means indicative of the rate of flow of fuel through the transducer means and fuel outlet means adapted to be connected to the fuel input of the carburation means, velocity sensor means to sense the speed of rotation of the internal combustion engine under test; load means to selectively supply a known resisting load to the engine under test to restrict the operation of the engine under test and computation means to continuously inter-relate the speed of rotation of the internal combustion engine under test to the fuel flow rate to provide an output signal indicative of the relationship between the speed of rotation of the internal combustion engine under test and the fuel flow rate.

2. The invention of claim 1 including computation means to continuously inter-relate the speed of rotation of the internal combustion engine under test to the fuel flow rate to provide an output signal indicative of the relationship between the speed of rotation of the internal combustion engine under test and the fuel flow rate.

3. The invention of claim 1 including means to selectively supply a resisting load to the engine under test to restrict the operation of the engine under test.

4. The invention of claim 1 wherein the source of fuel is a tank utilized to hold the fuel.

5. The invention of claim 1 wherein means are provided to continuously sense the condition of the battery.

6. The invention of claim 1 wherein the elements claimed therein are located within a single cabinet.

7. The invention of claim 1 wherein the load applied to the engine is applied by brake means inter-related with the output of the engine and where the brake means are regulated by means of pneumatic pressure.

8. The invention of claim 1 including pressure gauge means to continuously monitor the pressure of fuel supplied to said engine.

* * * * *